United States Patent
Banerji et al.

(10) Patent No.: US 8,046,441 B2
(45) Date of Patent: Oct. 25, 2011

(54) BUSINESS TO BUSINESS INTEGRATION SOFTWARE AS A SERVICE

(75) Inventors: Arindam Banerji, Sunnyvale, CA (US); Ramchandar Krishnamurthy, Bangalore (IN); Surjit K. Kaladharan, Trichur (IN); Ganapathy Raman Venkatasubramanian, Chennai (IN)

(73) Assignee: Infosys Limited, Bangalore (IN)

( * ) Notice: Subject to any disclaimer, the term of this patent is extended or adjusted under 35 U.S.C. 154(b) by 961 days.

(21) Appl. No.: 11/401,533

(22) Filed: Apr. 10, 2006

(65) Prior Publication Data
US 2007/0239858 A1 Oct. 11, 2007

(30) Foreign Application Priority Data
Feb. 13, 2006 (IN) .............................. 230/CHE/2006

(51) Int. Cl.
*G06F 15/177* (2006.01)
(52) U.S. Cl. ........................ 709/220; 709/228; 713/100
(58) Field of Classification Search .......... 709/220–221, 709/223, 228; 340/1.1–16.1; 710/104; 713/100; 717/11
See application file for complete search history.

(56) References Cited

U.S. PATENT DOCUMENTS

| | | | |
|---|---|---|---|
| 6,119,149 A * | 9/2000 | Notani ........................... | 709/205 |
| 6,205,466 B1 | 3/2001 | Karp et al. | |
| 6,240,416 B1 * | 5/2001 | Immon et al. ................... | 707/10 |
| 6,256,676 B1 * | 7/2001 | Taylor et al. ................... | 709/246 |
| 6,470,339 B1 | 10/2002 | Karp et al. | |
| 6,493,712 B1 * | 12/2002 | Karp et al. ........................ | 707/6 |
| 7,028,035 B1 | 4/2006 | Govindarajan et al. | |
| 7,107,591 B1 | 9/2006 | Karp et al. | |
| 7,165,113 B2 | 1/2007 | Karp et al. | |
| 7,698,398 B1 * | 4/2010 | Lai ................ | 709/223 |
| 2002/0091539 A1 * | 7/2002 | Yin et al. ......................... | 705/1 |
| 2002/0091614 A1 * | 7/2002 | Yehia et al. ..................... | 705/37 |
| 2002/0103900 A1 * | 8/2002 | Cornelius et al. ............. | 709/224 |
| 2002/0120704 A1 | 8/2002 | Karp et al. | |
| 2002/0161688 A1 * | 10/2002 | Stewart et al. .................. | 705/37 |
| 2002/0173984 A1 * | 11/2002 | Robertson et al. ................ | 705/1 |
| 2003/0084423 A1 * | 5/2003 | Clegg et al. .................... | 717/105 |

(Continued)

OTHER PUBLICATIONS

Microsoft. "Technical Overview of Terminal Services" [online] Jan. 2005 [Retrieved on: May 10, 2009]. Microsoft. [Retrieved from: <URL: http://download.microsoft.com/download/2/8/1/281f4d94-ee89-4b21-9f9e-9accef44a743/TerminalServerOverview.doc>.*
Banerji et al., "Web Services Conversation Language (WSCL) 1.0," W3C Note, Mar. 2002, 13 pages.
Govindarajan et al., "Conversation Definitions: defining interfaces of web services," W3C Workshop on Web Services, Apr. 11-12, 2001, 5 pages.

(Continued)

*Primary Examiner* — Philip Chea
*Assistant Examiner* — Eric W Shepperd
(74) *Attorney, Agent, or Firm* — Klarquist Sparkman, LLP

(57) ABSTRACT

The present technique includes a software framework which makes it possible for providing Business-to-Business (B2B) integration software as a service (SaaS). The framework follows a hub and spoke model wherein the hub and spoke communicate through web services. While the hub and spokes act as integration gateways with the enterprise systems, the hub also acts as a centralized remote command, control and configuration center for the entire setup. The hub software provides the ability to generate and remotely deploy the spoke environments and also manage them remotely. The generated spoke environment can be downloaded, installed and configured to connect to the local systems and act as a mediator for B2B integration between hub and the local systems. Once installed the environments are remotely managed through the management console provided by the hub software. This invention reduces the cost of B2B integration by amortizing the cost of remotely managing multiple trading partner gateways through a single management console.

15 Claims, 8 Drawing Sheets

U.S. PATENT DOCUMENTS

| | | | |
|---|---|---|---|
| 2003/0140126 A1* | 7/2003 | Budhiraja et al. | 709/220 |
| 2003/0154171 A1 | 8/2003 | Karp et al. | |
| 2004/0093397 A1* | 5/2004 | Chiroglazov et al. | 709/219 |
| 2005/0044197 A1* | 2/2005 | Lai | 709/223 |
| 2005/0193043 A1* | 9/2005 | Hoover | 707/204 |
| 2005/0234845 A1* | 10/2005 | Okunseinde et al. | 707/1 |
| 2005/0240651 A1 | 10/2005 | Govindarajan et al. | |
| 2006/0143685 A1* | 6/2006 | Vasishth et al. | 726/1 |
| 2006/0222003 A1* | 10/2006 | Majumdar | 370/466 |
| 2006/0253289 A1* | 11/2006 | Kymal et al. | 705/1 |
| 2007/0033252 A1* | 2/2007 | Combest | 709/204 |
| 2007/0239858 A1* | 10/2007 | Banerji et al. | 709/220 |

OTHER PUBLICATIONS

Govindarajan et al., "HP Web Services Architecture Overview," W3C Workshop on Web Services, Apr. 11-12, 2001, 6 pages.

Karp et al., "Split Capabilities for Access Control," Software Technology Laboratory, HPL-2001-164 (R.1), May 22, 2002, 14 pages.

Krishnamurthy et al., "Memory Contention in J2EE Applications for Multiprocessor Platforms," O'Reilly on Java.com, Nov. 10, 2004, 7 pages.

Krishnamurthy "Performance Analysis of J2EE Applications Using AOP Techniques," O'Reilly on Java.com, May 12, 2004, 6 pages.

* cited by examiner

Software for Implementing the Described Methods and Tools for Business to Business Integration Software as a Service 880

BUSINESS TO BUSINESS INTEGRATION SOFTWARE AS A SERVICE

TECHNICAL FIELD

The technical field generally relates to business to business (B2B) integration. More particularly, the field relates to computer software enabling B2B transactions between multiple parties such as trading partners.

BACKGROUND

Enterprises generally aim to integrate their computer systems with their trading partners for doing business efficiently. This is usually referred to as business to business (B2B) integration. As part of B2B integration, data transfers usually occur between the trading partners through a defined channel and in a defined format as agreed upon by the participating trading partners.

For enabling B2B integration both trading partners usually need to invest in software and infrastructure. Predominantly, smaller enterprises might not be able to invest in the infrastructure needed to meet the demands of larger enterprises, thereby delaying the integration and affecting the business of the large enterprises that can afford and are willing to invest.

Thus, there exists a need for improved B2B integration that is simple to implement and effective to manage for smaller enterprises in terms of effort required, timeliness, and cost expended.

SUMMARY

Described herein are various methods and tools for business to business integration software as a service.

In one aspect, a computer-implemented framework for business to business (B2B) integration Software as a Service (SaaS) using web services is provided that is simple to implement and effective to manage for smaller enterprises in terms of effort required, timeliness, and cost expended. Such a framework provides a downloadable and configurable client component that provides various features to integrate with local enterprise information system (EIS) systems. By providing remote deployment and management capabilities such a framework assists in amortizing the cost of managing multiple gateways of trading partners.

In another aspect, a hub and spoke model is followed. Such a model includes a hub environment that acts as a centralized remote command, control, and configuration center, generally hosted by a larger enterprise. Multiple spoke environments are remotely generated in the hub environment and then downloaded and installed to smaller enterprises, which usually cannot afford to invest in the software infrastructure needed to meet the demands of the hub.

In one embodiment, the hub environment comprises a centralized trading partner management system that allows trading partners to register through a web interface and then take the registrations through an approval process. The web-based management console available in the hub environment provides the ability to define the interfaces, transactions, connectors, and adapters for integrating with the spoke EIS. The hub also desirably comprises a spoke environment generator that uses the configurations made through the management console and generates a packaged spoke environment. The spoke environment can then be downloaded by the smaller enterprises and installed in their location.

In some embodiments, the hub environment also comprises an adapter generator that provides the ability to map data elements for a business transaction with data elements in a data source. The adapter generator then creates an adapter that has the ability to extract the data from the data source and format it to the appropriate transaction format. The adapter thus generated will be included as part of the spoke environment generated.

In other embodiments, the spoke environment also comprises one or more of and most desirably all of a web service access point (WSAP) to communicate with the hub environment by sending and receiving Simple Object Access Protocol (SOAP) messages using web services, a suite of connectors to establish connection to the local systems, a suite of adapters to transform data between the data format in local systems and the hub defined format, and a remote management server that enables remote maintenance of the spoke environment from the hub. The spoke environments can be configured to connect to local systems, extract data, transform such data to a format demanded by the hub, and transmit the transformed data to the hub. They can also have the ability to receive data from the hub, transform the data, and load it into internal systems.

In yet other embodiments, the hub environment further comprises a centralized remote management console that connects to the spokes and controls the spoke environments remotely. This provides the ability to maintain and upgrade the spokes from a single location, thereby reducing maintenance cost of the overall solution. Such remote maintenance includes addition, modification, or deletion of any data format and the associated mappings between the communication format and the format of the local systems (including new transactions), uploading of associated adapters and configuration of them, restarting of the adapters in case of failure, and monitoring of the status of any message.

DETAILED DESCRIPTION

Figure 1:
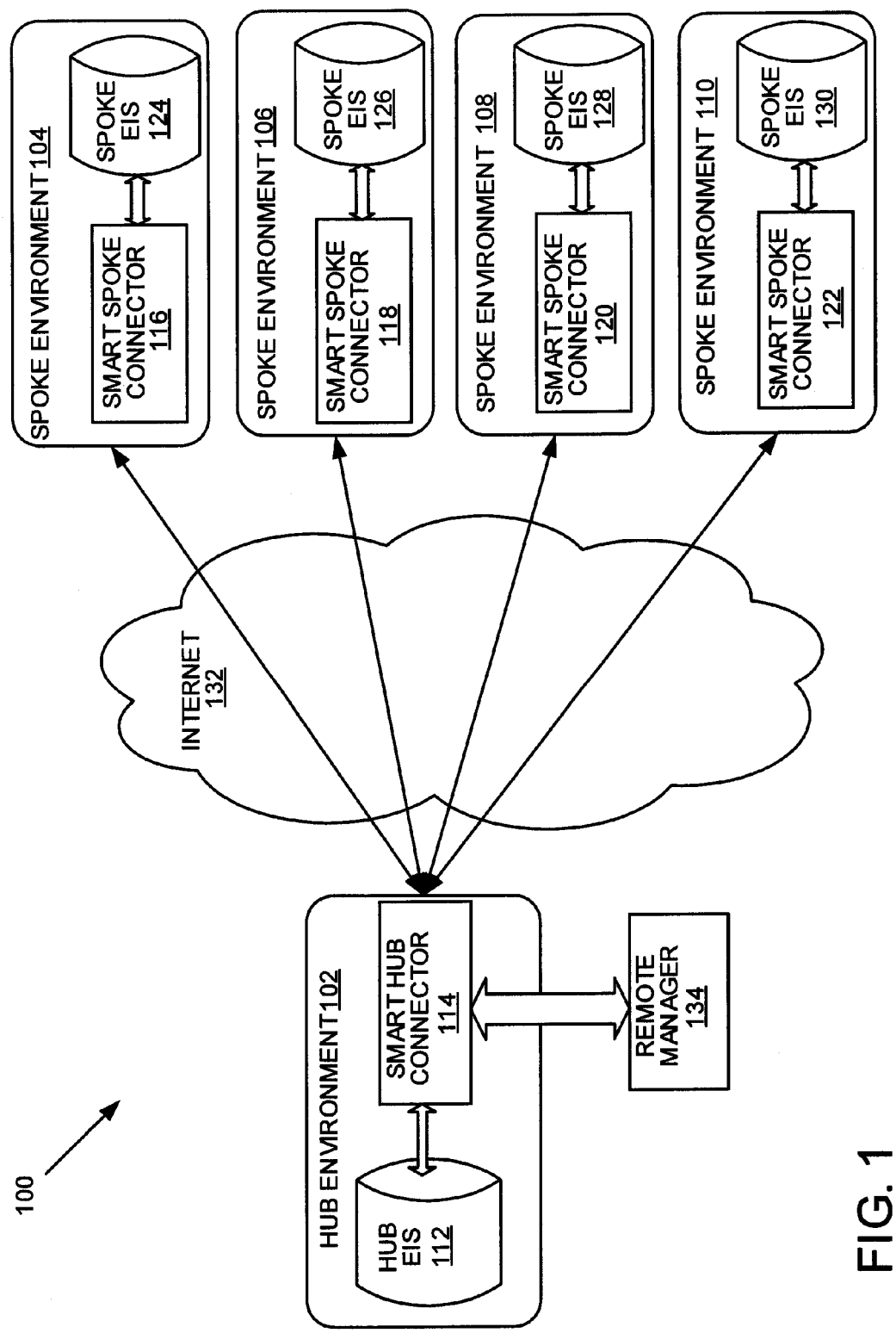
FIG. 1 is a block diagram showing an exemplary software system having an infrastructure for enabling business to business (B2B) integration Software as a Service (SaaS)

Electronic Data Interchange (EDI) generally refers to a technology for business to business (B2B) communication over a secure network established exclusively for business communication between the trading partners. Data is usually exchanged between the partners in standard EDI formats. The cost of this implementation generally includes EDI gateways in both the trading partner environments, establishing a secure Virtual Area Network (VAN), and creating custom software programs or buying packaged tools to extract the data from local systems and transform the data to EDI format. The cost also generally includes management of these environments in each trading partner site and handling of exceptions and transaction errors.

A Web Service generally refers to a technology that enables interaction through a global communications network, such as technology using the Simple Object Access Protocol (SOAP) to enable interaction with systems through the Internet. In a B2B scenario, trading partners can exchange transaction data through secure Web Services. The cost usually involves creating a software program or buying packaged tools to expose data through Web Services.

Enterprise Application Integration (EAI) generally refers to a mechanism that enables integration of systems within an organization and provides a unified view for the enterprise data. Standard EAI tools are available that provide adapters to connect to native systems and fetch the data. Such tools usually provide adapters for all or many standard systems (e.g., SAP and People Soft) and also often provide a framework to write custom adapters for non-standard systems (e.g., home grown systems). Such EAI systems generally provide EDI gateways for EDI communication and usually have the capability to expose web services.

Software as a Service (SaaS) generally refers to a concept regarding services relating to the delivery and remote access of software applications via the internet. This concept is often referred to as On-Demand Applications or On-Demand Software. Characteristics of SaaS desirably include:
  Network-based access.
  Management of software.
  Activities that are managed from central locations rather than at each customer's site, thereby enabling customers to access applications remotely via the Internet.
  Application delivery that is usually closer to a one-to-many model (e.g., single instance, multi-tenant architecture) than to a one-to-one model, including architecture, pricing, partnering, and management characteristics.

J2EE Connector Architecture (JCA) generally refers to a standards-based mechanism of accessing legacy systems from Java/J2EE applications that significantly reduces the inherent challenges of legacy system integration. Connector builders (e.g., the Sun One Connector Builder) can provide graphical wizards to guide a developer through the connector development process. They can also provide code generators that create customized code to enable fast, easy integration of connectors with back-end enterprise and legacy systems. Other connector architectures can be used when appropriate in addition to, or in place of, this exemplary connector architecture.

Hub and Spoke Architecture generally refers to a software architecture where the central software framework manages and interacts with multiple lightweight software components that are distributed across a network.

Extract, transform and load (ETL) tools generally enable companies to move data from multiple sources, reformat and cleanse it, and load it into another database, a data mart, or a data warehouse for analysis, or on another operational system to support a business process. Such tools generally provide graphical user interfaces to map the source and destination data visually and provide runtime components that can make the transformation according to these maps.

Exemplary Business to Business Software as a Service Architecture

FIG. 1 is a block diagram showing an exemplary software system 100 having an infrastructure for enabling B2B SaaS. The software system 100 comprises a hub (e.g., host) environment 102, which resides either in an organization desiring integration with its trading partners or in an organization that is hosting the B2B integration, and multiple spoke environments, such as 104-110. The spoke environments desirably reside at corresponding trading partners of the organization. The hub environment 102 and the spoke environments 104-110 desirably communicate over a global communications network, such as the Internet 132, through secure channels (e.g., Virtual Private Network (VPN) channels) between a hub smart connector 114 and corresponding spoke smart connectors 116-122. The hub smart connector 114 provides a connection to a hub environment EIS system 112, whereas the spoke smart connectors 116-122 provide connections to corresponding local EIS systems 124-130 of the spoke environments. The hub and spoke environments can be remotely managed through a remote manager 134.

Exemplary Hub Environment

Figure 2:
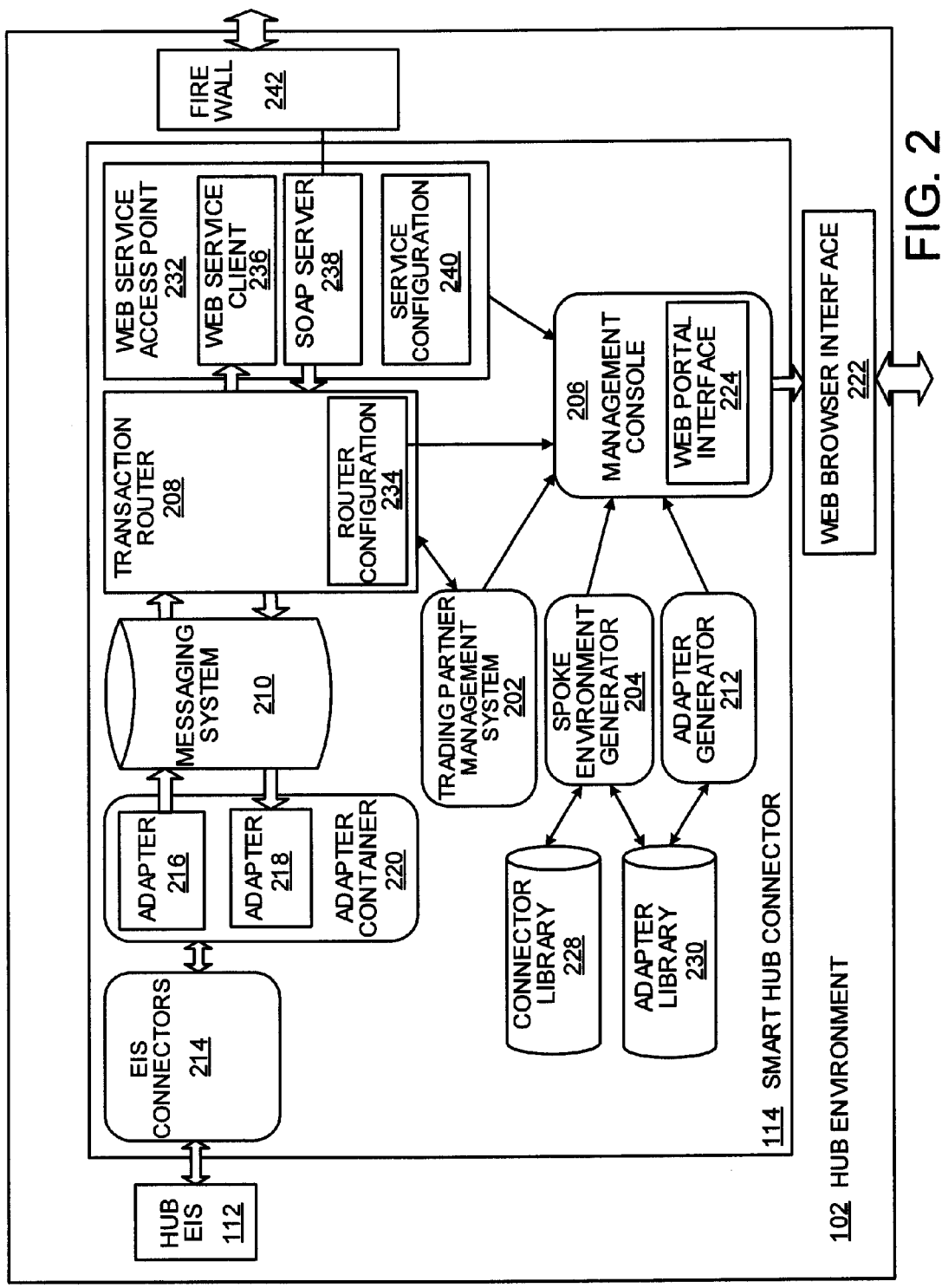
FIG. 2 is a block diagram showing an exemplary hub environment of a software system, such as an example of hub environment 102 of the exemplary software system 100 of FIG. 1.

FIG. 2 is a block diagram showing an exemplary hub environment 102 of a software system, such as the exemplary hub environment 102 of the exemplary software system 100 of FIG. 1. The hub environment 102 in one example is hosted by a trading partner that hosts the solution and acts as the centralized remote command, control, and configuration center. The illustrated hub environment 102 comprises a hub smart connector 114 that, in this example, desirably comprises a Trading Partner Management System 202, a Spoke Environment Generator 204, a Management Console 206, a Transaction Router 208, a Messaging System 210, an Adapter Generator 212, EIS Connectors 214 to EIS system 112, and Adapters 216-218 in an Adapter Container 220. A Web Service Access Point 232 comprises, in this example, a Web Service Client 236, a SOAP Server 238 connected to a firewall 242, and a Service Configuration 240. The system is coupled via the firewall to the Internet in this configuration.

The Trading Partner Management System 202 captures and maintains information that enables the hub environment 102 to transact with a spoke environment (e.g., a Trading Partner). This is provided through a Web Browser Interface 222 that connects with a Web Portal Interface 224 in the Management Console 206. In the illustrated example, the Web Browser Interface 222 is also coupled to the remote manager 134 (FIG. 1). It desirably provides the following capabilities:
  Set up transaction definitions and related authorization rules for a Trading Partner.
  Set up Trading Partner specific transformation rules at transaction level wherein the transformation rules contain code conversion and output formats.
  Set up and maintain connection information of the Trading Partner, wherein the Transaction Router 208 would use this information to direct the transaction message to the appropriate spoke environment.

An exemplary Spoke Environment Generator 204 desirably puts together and packages a spoke environment as a downloadable installation package during a configuration phase. The Generator 204 desirably provides the Web Browser Interface 222 for the user to choose the various options that determine the configuration of the package. The Web Browser Interface 222 provides access to a Connector Library 228 and an Adapter Library 230 for standard environments that are already available. The exemplary Spoke Environment Generator 204 desirably provides for:

- Adding new Connectors and new Adapters to the Libraries.
- Choosing EIS Connectors for a spoke environment.
- Choosing standard transactions that are enabled for the spoke environment.
- Choosing the corresponding Adapters for the transaction in the spoke environment.
- Setting the hub environment connection information that would be maintained in the Web Service Access Point 232 of the spoke environment to communicate with the hub environment 102.
- Packaging components of the spoke environment together and making an installable package that would be available for download.

The exemplary Management Console 206 desirably is a web portal that provides a centralized access to Smart Connector environments for remote management and monitoring of them. The portal desirably comprises the following:

- An Interface to the Management Servers of the various spoke environments.
- An Interface to the Spoke Environment Generator 204.
- An Interface to the Trading Partner Management System 202.

The exemplary Transaction Router 208 desirably is a run time component in the hub environment 102 that receives transaction messages from the hub EIS system 112 and, based on the Trading Partner setup, routes the messages to the appropriate spoke environment using a Router Configuration 234. The exemplary Transaction Router 208 desirably has the following characteristics:

- Transactions from the hub environment 102 pass through the Transaction Router 208.
- The Transaction Router 208 looks into a transaction for the specific Trading Partner code.
- Based on the Trading Partner configuration, the Transaction Router 208 decides to which spoke environment it should forward a message.
- The Transaction Router 208 invokes a Web Service in the Spoke Environment for the corresponding transaction type and sends back the response to the hub environment EIS 112.

Exemplary Adapter Generator

The hub environment 102 desirably comprises an Adapter Generator 212, which enables easy integration with varied enterprise information systems. The Adapter Generator 212 in one exemplary form combines capabilities of connector builders commonly found in J2EE Connector Architecture related tools and the extraction and transformation capabilities generally found in ETL tools. The Adapter Generator 212 desirably in one form not only generates the connector code to interact with the enterprise systems but it also generates the code that implements the mapping between the data elements of the business transaction and the data fields in the enterprise the data source. The adapters thus generated can be included as part of the spoke environment during the spoke environment generation during a bootstrap stage. During the runtime phase of a solution, the adapter 212 can be generated and remotely deployed to the spoke environments using the centralized remote management console. This enables efficient deployment of modifications to the transactions in the spoke environments by a centralized maintenance team.

The administrator can use an adapter generator connectivity option to create the enterprise connector. The connector provides the basic connection mechanism from the spoke environment to the enterprise information system. Such a connector desirably provides access to the data fields and the APIs of the enterprise system and a means to invoke them from the spoke environment.

The administrator can use an adapter generator data mapping option to create a transaction adapter. The generator 212 desirably provides a graphical user interface, similar to ETL tools, that allows the administrator to visually map the data elements in the business transaction with the data fields in the EIS. The generator 212 also desirably generates a run-time component, the transaction adapter, which can be plugged in into the spoke environment remotely from the management console. The transaction adapter thus generated in one form can implement the standard management APIs similar to the Java Management Extensions (JMX) such that they can be managed and monitored using standard tools, as well as by using the remote management console hosted in hub environment.

Exemplary Spoke Environment

Figure 3:
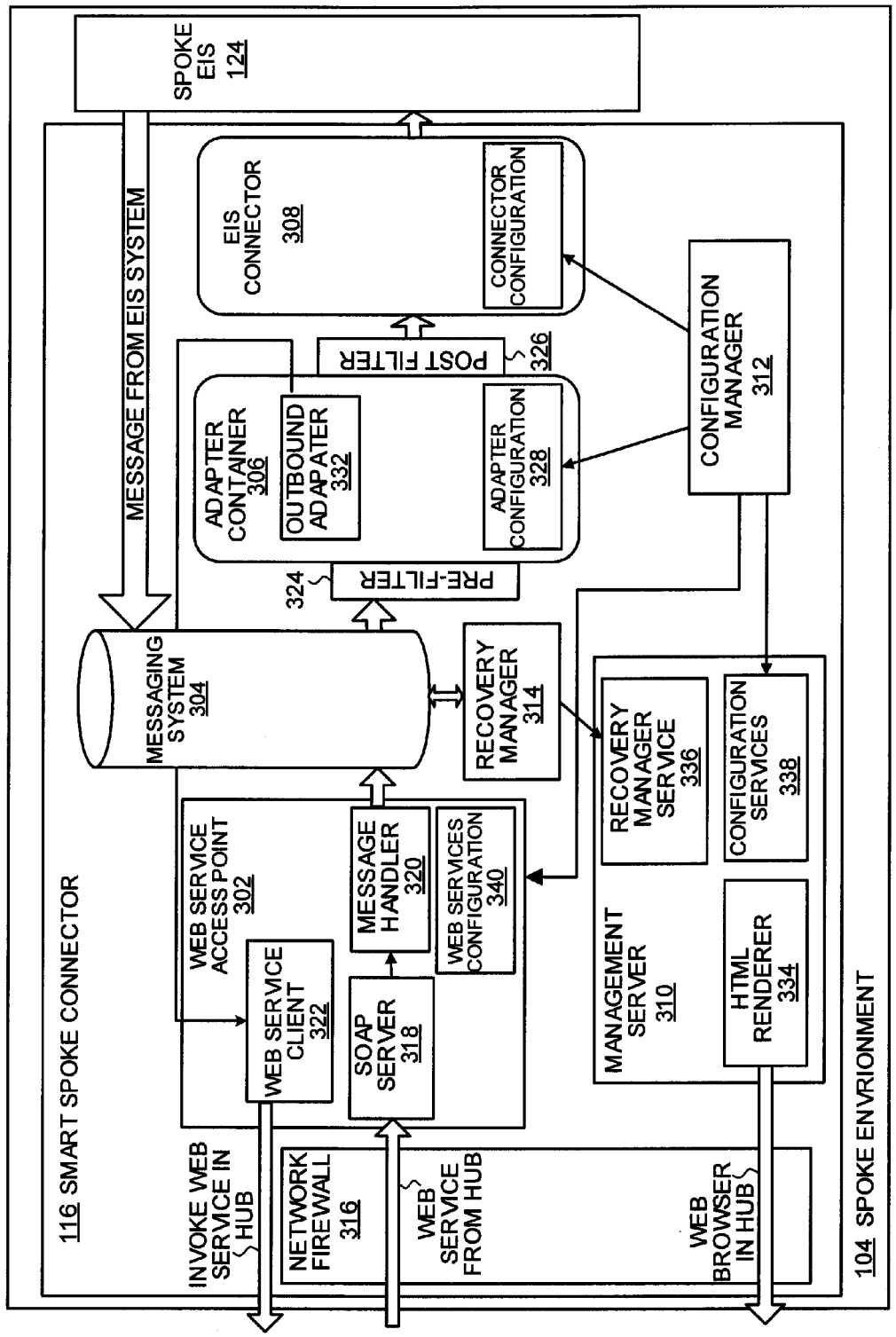
FIG. 3 is a block diagram showing an exemplary spoke environment of a software system, such as an example of spoke environment 104 of the exemplary software system 100 of FIG. 1.

FIG. 3 is a block diagram showing an exemplary spoke environment 104 of a software system, such as one of the exemplary spoke environments 104-110 of the exemplary software system 100 of FIG. 1. The illustrated spoke environment 104 comprises a smart connector spoke 116 that comprises, in one example, a Web Service Access Point 302, a Messaging System 304, an Adapter Container 306, EIS Connector 308 to EIS system 124, Adapters (not shown), a Management Server 310, a Configuration Manager 312, and a Recovery Manager 314, and a network firewall 316 that prevents unauthorized access to a SOAP Server 318 in the Web Service Access point 302.

The exemplary Web Service Access Point 302 comprises the following:

- A SOAP Server 318 that receives a SOAP message and extracts the message payload from the SOAP invocation The SOAP Server 318 is desirably configured with an SSL certificate for which a corresponding client certificate is registered with the Hub. The interaction between the hub environment and the spoke environment 104 can be through a two-way SSL handshake with client certificate authentication.
- A Message Handler 320 looks into the message payload and extracts the message along with the transaction type. The Message Handler 320 passes the message to the Messaging System 304.
- A Web Service Client 322 invokes the Web Services in the hub environment for transactions initiated by the Spoke Environment 104.

The Messaging Service 304 desirably uses a message queue to provide delivery of messages. This exemplary infrastructure handles failure or stoppages of either the EIS system 124 or the hub environment 104. Messages from the hub environment 104 through the Web Service Access Point 302 are passed to the Messaging Service 304 which places them in the message queue. The Messaging Service 304 then passes these messages through the pre-filter 324 to the Adapter Container 306. Upon successful execution of an adapter, the Messaging Service 304 removes the message from the queue.

The Messaging Service 304 also acts as an integration point between the EIS system 124 and the spoke environment 104 when the flow of control is from the spoke environment to the hub environment. When the spoke environment needs to initiate a transaction, the EIS system 124 places a message through the Messaging Service 304 which then picks the message and passes the message to the Adapter Container 306 and then via the Web Service Client 322 to the hub environment 102. Upon successful execution of an adapter, the Messaging Service 304 removes the message from the queue.

The Configuration Manager 312 desirably plugs in as a module into a Web Server that receives both Web Service requests from the hub environment and also serves the Remote Management Console of the hub environment. The manager 312 desirably, in one form, provides a service to manage the following configurations:
  Adapter configurations are desirably maintained by the Adapter Container 306:
    The relationship between transactions and adapters can be viewed and modified.
    Pre and post filters 324-326 can be set for adapters for specific transactions.
  Web Service configurations 340 are desirably maintained by the Web Service Access Point 302:
    SSL certificates for the environment can be set up.
    Information in which the Web Services would be exposed can be hosted and ported.
  EIS Connector configurations:
    Set connection parameters to access the EIS system 124 (e.g., id and password).

The Configuration Manager 312 desirably provides a service for defining new transaction types and authorization for them in spoke environment 104. Manager 312 in this embodiment updates the configuration Extensible Markup Language (XML) 328 of the Adapter Container 306 with the new transaction types. Manager 312 also desirably provides a service for deploying new Adapters into the Adapter Container 306.
  It provides a facility to upload an Adapter implementation through a web browser and places the Adapter implementation in a pre-defined area in the spoke environment 104.
  It modifies the configuration XML 328 of the Adapter Container 306 to include an Adapter for a corresponding transaction type.

The Adapter Container 306 in one exemplary form defines a standard list of interfaces to invoke Adapters. Adapters in the Adapter Container 306 will implement standard interfaces during Adapter generation. One exemplary Adapter Container 306 has the following functionality:
  Maintains the relationship between a specific Transaction Type and a corresponding Adapter:
    E.g., maintains the relationship between XML-based configuration file generated by the Spoke Environment Generator and maintained by the Configuration Manager 312.
    Relationship details can include:
      Transaction Type (includes standard message types such as PO (Purchase Order), PO Ack, (Purchase Order Acknowledge) Invoice, ASN (Advance Shipping Notice), etc or non-standard custom generated message types).
      Adapter unique identifier.
      Connection pool size.
      Parameter set for Adapter.
      Pre/Post filter 324-326 details.
  Manages the invocation lifecycle of the Adapter:
    Manages adapter connection pooling, for example, based on pool size setup for the Adapter to load balance the Adapter requests.
    Manages message service requests from the Web Service Access Point 302 to invoke an Adapter.
    Controls the invocation of adapter based on relationship details maintained in the control XML 328.
  Provides configurable pre and post filters 324-326 for the Adapters. These filters 324-326 can be utilized for various purposes, such as Auditing requirements or transmission of transaction data to Supply Chain Visibility environments. Exemplary pre and post filters 324-326 can have the following functionality:
    The Pre/Post filters 324-326 desirably provide interfaces to the Adapter Container 306 to extract information from adapters at invocation as well as run completion.
    The Pre/Post filters 324-326 desirably can be used to add any message validation, message transformation services.
    The Pre/Post filters 324-326 desirably can be used to build auditing services.
    The Pre/Post filters 324-326 desirably can be used to build Information Visibility services.
    The Pre/Post filters 324-326 desirably can be configured using the Configuration Manager 312.
  Implementing management interfaces to show the health (e.g., proper functioning) and status of the Adapters, such as providing standard management interfaces for use in monitoring adapters.

The EIS Connector 308 desirably provides the connection mechanism to the Enterprise Systems in the Spoke environment. Connector 308 can have the following functionality:
  Provides standard connection mechanisms available to connect to enterprise systems, such as those that include Open Database Connectivity (ODBC), Java Database Connectivity (JDBC), other standard connection drivers or standard Enterprise Resource Planning (ERP)/Customer Relationship Management (CRM)/Supply Chain Management (SCM) connectors, such as SAP connectors, Oracle 11i connectors, Siebel connectors, Baan connectors, J2EE Connector Architecture (JCA) connectors for Customer Information Control System (CICS), etc.
  Maintains the connection configurations:
    Maintains data source details: e.g., source machine IP, port, password, database name, file server, directory, filenames, etc.
    Enables the system and/or users to Add/Modify/Delete data sources through Configuration Manager 312.
  Manages the lifecycle of the connections to the Enterprise Systems:
    Manages connection pooling to load balance connection.
    Provides transaction management to ensure atomicity of transaction.
    Acts as a security manager.
  Implementing management interfaces to show health and status of the EIS Connector 308 by providing standard or other management interfaces for monitoring the EIS Connector 308.

The Adapters desirably provide the extraction mechanism to extract the necessary data from the EIS for a specific transaction. The following comprise functionality and characteristics of an exemplary Adapter:
  Providing an extraction mechanism for a specific transaction. The output, for example, can be the data elements that are defined for a transaction and the input can be from the EIS system 124.
  Adapters can implement standard adapter container interfaces.

Adapters can be either inbound or outbound:
An Inbound Adapter can utilize the EIS Connector API to interact with the EIS system 124.
An Outbound Adapter 332 can invoke the Web Service Client 322 to send across the information to the hub environment.
Adapters can be an interface programmed with code that provides transformation logic from a source EIS system 124 to a target data element or vice-versa.
Adapters can be created and configured during the bootstrap stage and can be packaged as part of the spoke environment 104.
Adapters can also be generated post-deployment and deployed to the spoke environment 104 remotely using, for example, the centralized remote management manager (e.g., 134 in FIG. 1).

The Management Server 310 of FIG. 3 is desirably the controlling point in the exemplary spoke environment 104 through which the hub environment remotely manages, configures and monitors the spoke environment 104. The exemplary Management Server 310 operates in two modes: HTML mode, where it exposes the services in the spoke environment 104 through HTML pages which can be viewed from the hub environment, and Web Services mode, where it exposes the services as Web Services that are invoked by the Remote Management Console of the hub environment to provide a consolidated view of the spokes. The illustrated Management Server 310 desirably provides access to the following services:

Service to start/stop/re-start the Spoke Environment. This service would in turn invoke the APIs to stop/start the Web Server and the EIS Connectors.
Service to provide health and run-time metrics of the Adapters and EIS Connectors. This Service would expose the management interfaces implemented by the Adapters and Connectors. Through the management interfaces, these components expose whatever metrics are pertinent.
In HTML mode, 310 provides an HTML Renderer 334 for services provided by the Configuration Manager 312. In Web Services mode, Server 310 provides Web Service access to these configuration services 338.
Server 310, in the form shown, also comprises an interface for the Recovery Manager Service 336 to start the recovery process in the spoke environment 104.

The exemplary Spoke Recovery Manager 314 in the spoke environment 104 handles failure conditions. The Spoke Recovery Manager 314 in one form has the ability to handle the failure of the hub environment, failure of the EIS system 124, and failure of transport to the hub environment. The Spoke Recovery Manager 314 can be invoked from the remote management console 134 (FIG. 1), which can be used to remotely control, manage, and monitor the spoke environments in a centralized manner. The exemplary Spoke Recovery Manager 314 can perform the following when in a recovery mode:

Initializes the EIS connector 308 and Adapters.
Restarts the Messaging Service 304 in the spoke environment 104.
Restarts the SOAP Server 318 and Web Server Environments.

Exemplary Setup of a Smart Connector Hub Environment

Figure 4:
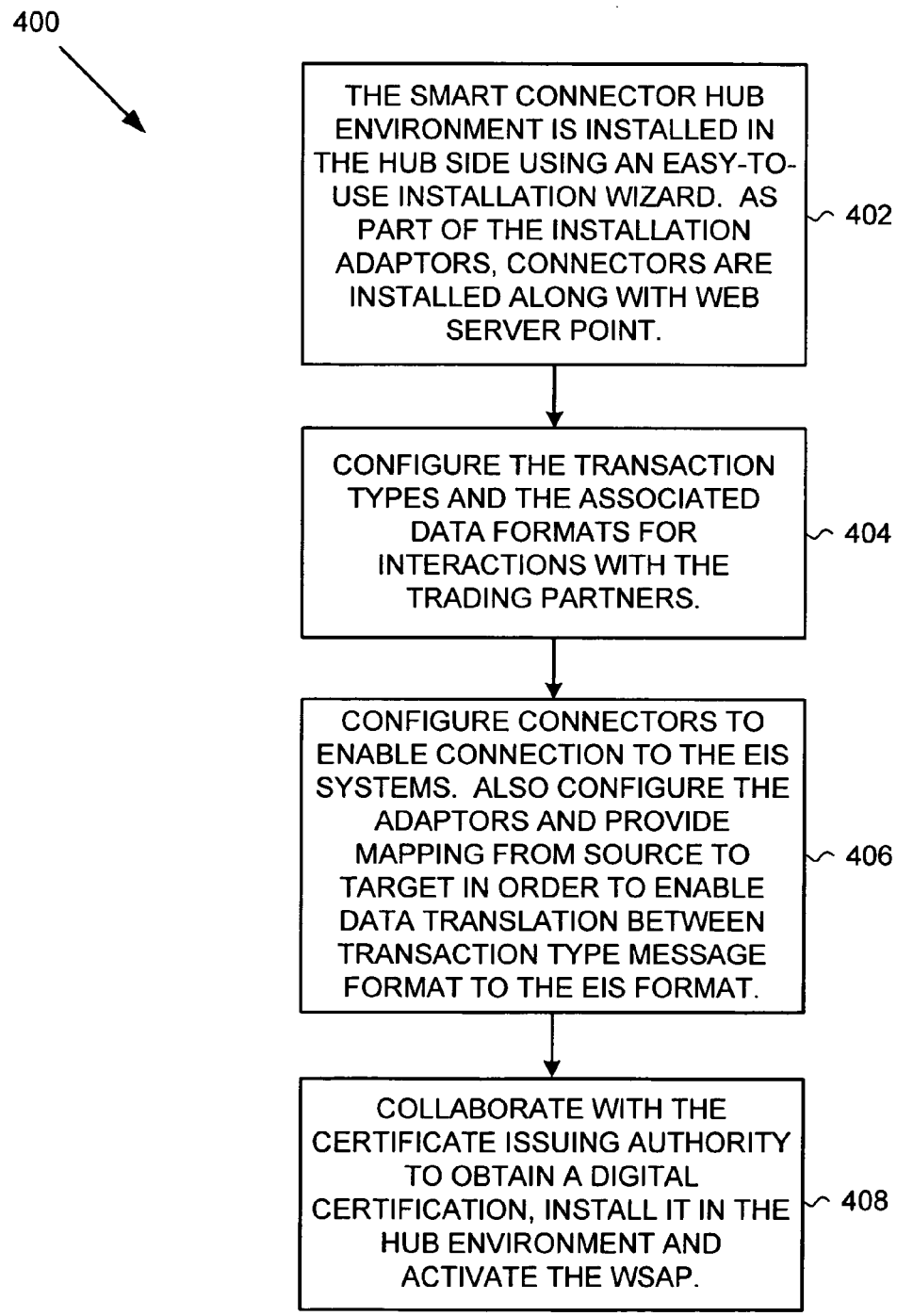
FIG. 4 is a flow diagram showing an exemplary process for installing and setting up a hub environment, such as the exemplary hub environment 102 of the exemplary software system 100 of FIG. 1.

FIG. 4 is a flow diagram showing an exemplary installation and setup 400 of a Smart Connector Hub environment.

At 402, the Smart Connector Hub Environment is installed in the hub side, such as by using an installation wizard. As part of the installation of adapters (e.g., 216-218 of FIG. 2), connectors (e.g., 214 of FIG. 2) are installed along with the web server point (e.g., 232 of FIG. 2).

At 404, the transaction types are configured as well as the associated data formats for interactions with the trading partners.

At 406, connectors are configured to enable connection to the EIS systems. Also, the adapters are configured and mapping is provided from source to target in order to enable data translation between transaction type message format to the EIS format.

At 408, collaboration with the certificate issuing authority occurs, for example, to obtain a digital certificate, which is then installed in the hub environment. Also, the WSAP is activated.

Configuration of the Hub environment can comprise the following activities:

Installation of the Smart Connector Hub software in the Hub environment. A simple wizard-based interface can help the user install the software.
Definition of the transaction types including the message format for exchanging data between the hub and spokes. The definition can be done through the management of the Configuration Manager.
Configuration of the EIS Connectors in the Hub to connect with the EIS system of the Hub.
Setting up the Web Service Access Point by providing the appropriate digital certificate obtained from the Certification Authority and setting up the firewall to open specific ports to allow only Web Service requests.
Configuring the management console to support HTTPS and again configure the firewall to allow HTTP/S access to the management console.

Exemplary Creation of a Smart Connector Spoke Environment

The creation of a spoke environment for a new trading partner is described through the following steps:

The user logs into the management console (e.g., 206 of FIG. 2) of the Hub environment and chooses the Trading Partner Management option. In the Trading Partner Management the user does the following:
Creates a new Trading Partner.
Sets up the transactions that are going to be active for the Trading Partner.
Sets up the code conversion and transformation rules for specific transactions of the Trading Partner.
Sets up the network information to access the Spoke environment residing with the Trading Partner.
From the management console, the user can then choose the Spoke Generator option. In the Spoke Generator the user can perform the following:
Adds a new environment setup for the new Trading Partner.
If the spoke has an EIS environment for which no adapter exists for the transaction, the user chooses the Adapter Generator option:
In the Adapter Generator (e.g., 212 of FIG. 2), the data elements for the new transaction are defined.
The mapping between the data elements and the source data (such as in XML, Database, or flat files) is created using a graphical tool.
Adapters are generated for the provided mapping.

The user chooses the specific EIS connector that applies to the Trading Partner environment from a library of EIS connectors.

For each of the transactions that are activated for the Trading Partner in Trading Partner Management, the user can select an Adapter from the adapter library and the adapter can be assigned to the transaction.

The user can set the configuration information of the Web Service Access Point (e.g., 302 of FIG. 3) the spoke environment 104 with the appropriate network information for communication with the Hub environment 102. The user can also set the appropriate client SSL certificates for the access point.

The user can choose the Generate option. The Spoke Generator (e.g., 204 of FIG. 2) creates a full environment specific for the Trading Partner which comprises of all the machinery specific in the Spoke section. This is a run time environment that would be ready to be accessed from the Hub. The spoke environment is created based on the Trading Partner setup and the EIS connectors chosen, the adapters chosen and the access information to the Hub. The environment can be packaged as an installable.

Exemplary Installation and Setup of a Spoke Environment

Figure 5:
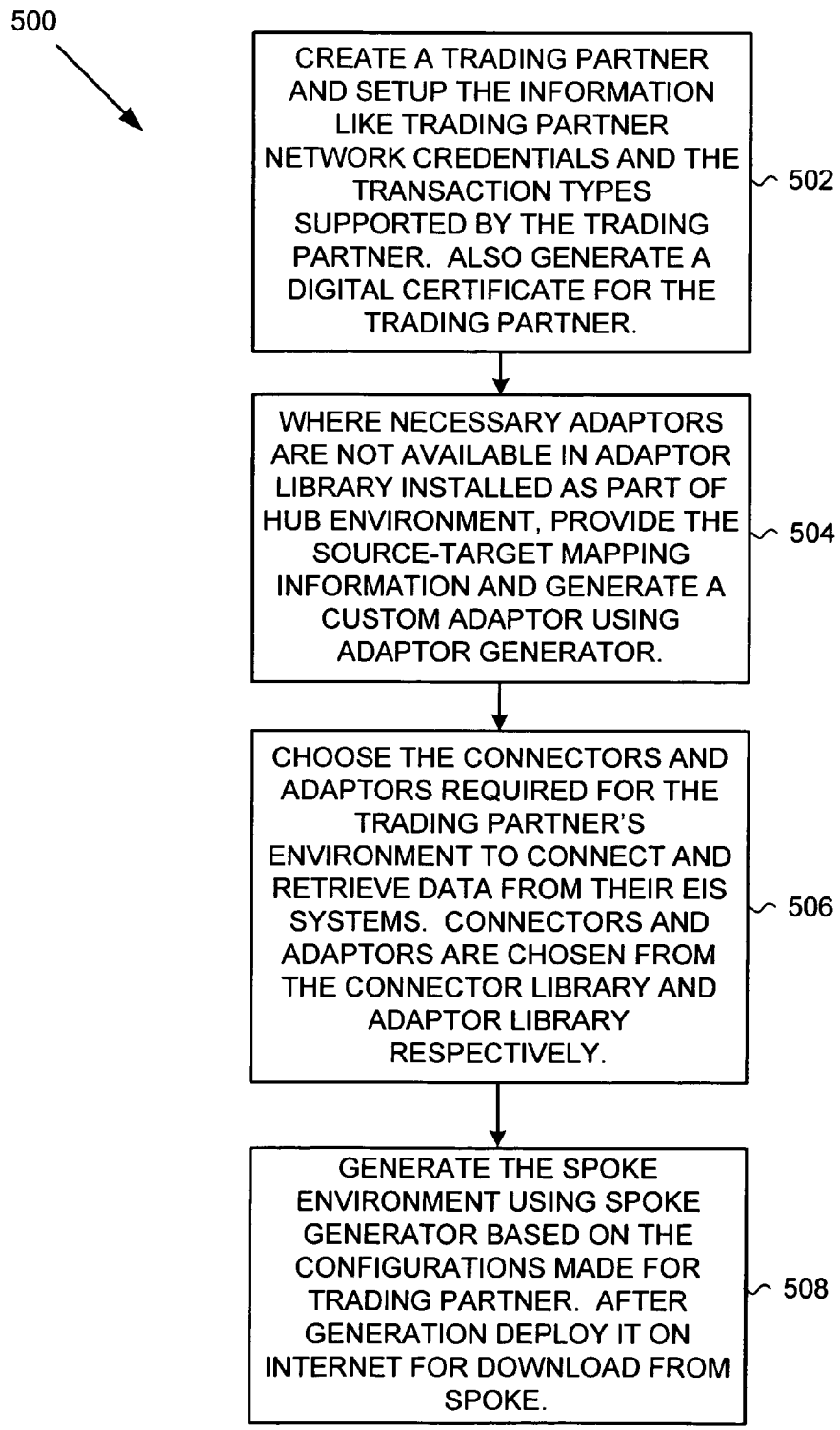
FIG. 5 is a flow diagram showing an exemplary process for installing and setting up a spoke environment of a software system, such as the exemplary spoke environments 104-110 of the exemplary software system 100 of FIG. 1.

FIG. 5 is a flow diagram showing an exemplary installation and setup 500 of a spoke environment (e.g., 104 of FIG. 1).

At 502, a trading partner is created and information such as trading partner network credentials and transaction types supported by each trading partner is set up. Also, a digital certificate can be generated for each trading partner.

At 504, source-target mapping information is provided and a custom adapter is generated using an adapter generator (e.g., 212 of FIG. 2) where necessary adapters are not available in the adapter library (e.g., 230 of FIG. 2) installed as part of the hub environment (e.g., 102 of FIG. 1).

At 506, the connectors and adapters required for each trading partner's environment to connect and retrieve data from their EIS systems are chosen. Also, connectors and adapters are chosen from the connector library (e.g., 228 of FIG. 2) and adapter library 230, respectively.

At 508, the spoke environment 104 is generated using the spoke generator (e.g., 204 of FIG. 2) based on the configurations made for the trading partner. After generation, the spoke environment 104 can be deployed on the Internet as an installable for download to the spoke 104. Thus, for example, from the Spoke, the user can access the Hub management console through a web browser. The user can download the spoke environment software and run it. The spoke environment software can be self-installing software that desirably creates the full Spoke environment 104. In the Spoke, appropriate firewall settings can be made to make the Spoke environment 104 accessible from the Hub 102. The configuration settings for the connectors to access the EIS of the Spoke can be made using the configuration manager (e.g., 312 of FIG. 3). A user at the Hub 102 can enable the spoke environment, e.g., by way of the management console (e.g., 206 of FIG. 2) to activate the Spoke environment 104.

Exemplary Runtime Process of the Hub and Spoke Environments

Figure 6:
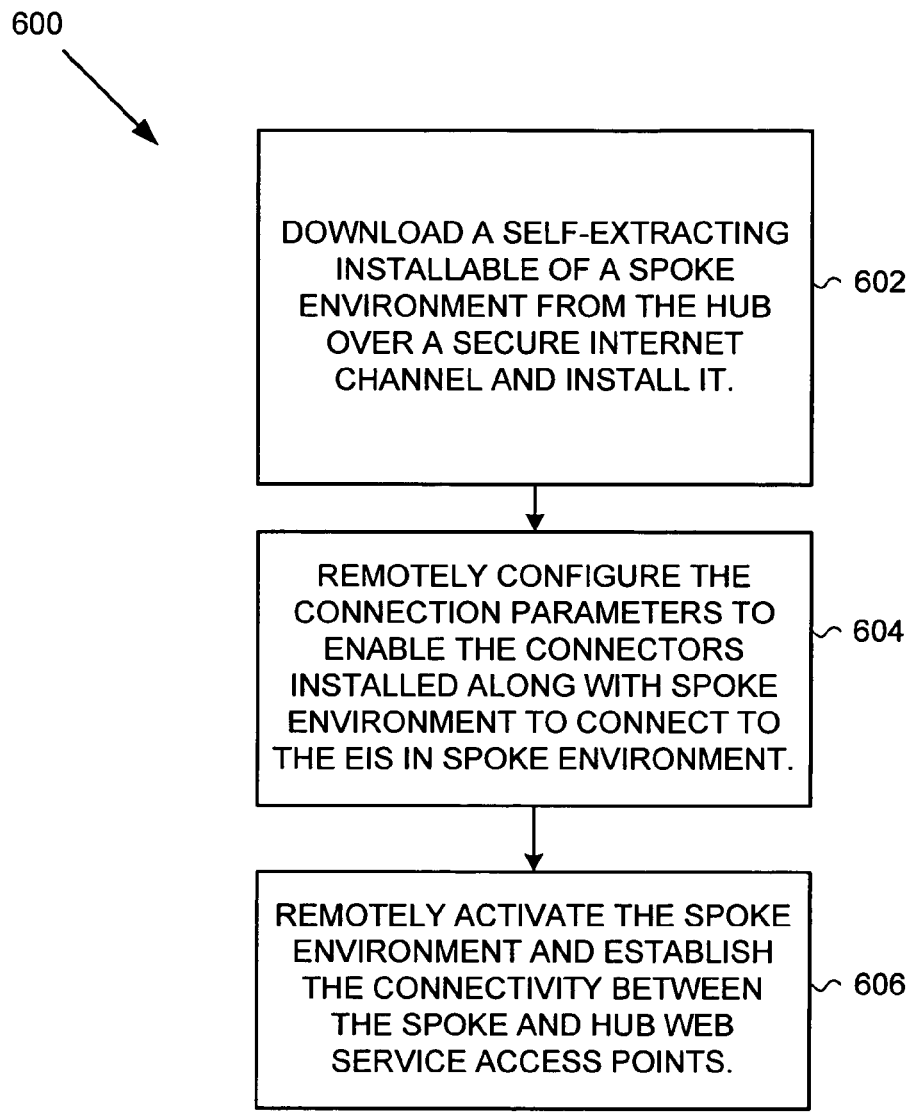
FIG. 6 is a flow diagram showing an exemplary runtime process of a hub environment and a spoke environment.

FIG. 6 is a flow diagram showing an exemplary runtime process 600 of a Hub environment and a Spoke environment.

At 602, a self-extracting installable of a spoke environment is downloaded from the hub over a secure internet channel and installed.

At 604, the connection parameters are desirably remotely configured to enable the connectors, installed along with the spoke environment, to connect to the EIS in the spoke environment.

At 606, the spoke environment is desirably remotely activated and connectivity between the spoke and hub web service access points is established.

Exemplary Inbound and Outbound transactions are explained below with respect to the Hub environment. These exemplary transactions can be varied but do assist in illustrating the operation of one exemplary embodiment.

Inbound Transaction
- Inbound transactions are initiated or triggered from a Spoke environment EIS system.
- The EIS system publishes the message to be sent to Hub to the Spoke messaging system:
    - The EIS system will connect to the messaging system.
    - The EIS system will produce the message.
    - The EIS system publishes the message in a message queue for adapter container.
- The messaging system invokes an inbound adapter:
    - The messaging system delivers the message to message type consumer queue, which can be in the adapter container.
    - An adapter container invokes the inbound adapter for the transaction type from an adapter pool, based on the adapter container configuration XML.
- An inbound adapter translates the message and sends it to a Web Service Access Point:
    - The inbound Adapter translates the message passed by the Adapter container into a format suitable for the Hub environment.
    - After translation, the inbound adapter calls the Spoke outbound service from the Spoke Web Service Access Point to send the message to the Hub environment
- The Spoke Web Service Access Point invokes the Hub Web Service Access Point:
    - The Spoke outbound service takes the message from adapter.
    - The Spoke outbound service uses security filters and client authentication keys to encrypt the message.
    - Invocation of the Hub Web Service through the Internet.
- The Hub Web Service Access Point listens to the Spoke invocation, validates the message, and sends the message to transaction router:
    - The Hub Web Service listener listens to the spoke invocation.
    - The Hub decrypts the message using security filters and the client authentication key.
    - The Hub identifies the Spoke and validates and verifies the authorization details for the partner from Trading Partner management system.
    - If the verifications succeed, the Hub passes the message to the transaction router.
- The Transaction Router sends the message to the Hub EIS system:
    - The Transaction router reads the message details and identifies the transaction type and Hub destination.
    - The Transaction router delivers the message as needed by Hub destination systems.

Outbound Transaction
- Outbound transactions are initiated or triggered by Hub environment systems.

The Hub environment system sends the message to transaction router:
  The Hub environment sends the message to the transaction router messaging service queue to be sent to the Spoke. The message can also include the envelope or header information, which contains the Spoke destination details.
  The transaction router picks reads the header or envelope information and identifies the Spoke trading partner destination, as well as authentication and security information from the trading partner management system.
The transaction router sends the message and trading partner information to the Hub Web Service Access Point:
  The Hub Web Service Access Point listens to the transaction router invocation and reads the message and trading partner information.
  The Hub Web Service Access Point uses the trading partner destination and authentication and security information, and encrypts the message using security filters.
The Hub Web Service Access Point invokes Spoke Web Service Access Point:
  The encrypted message from the Hub Web Service Access Point can be transmitted over the Internet.
  The Hub Web Service Access Point invokes a web service from the Spoke environment.
  The Spoke Web Service Access Point reads the encrypted message.
The Spoke Web Service Access Point decrypts, validates, and sends the message to the messaging service:
  The Spoke Web Service Access Point uses security filters at the spoke environment and decrypts the message and validates it.
  The Spoke Web Service Access Point connects to the spoke messaging system and produce the message.
  The message queue will publish the message in the message queue for the adapter container.
The messaging system invokes the outbound adapters:
  The messaging system delivers the message to the message type consumer queue, which will be the adapter container.
  The adapter container invokes the outbound adapter for the transaction type from the adapter pool, based on the adapter container configuration XML.
The outbound adapter translates the message and sends it to the EIS system using the EIS connector:
  The Outbound Adapter translates the message passed by the Adapter container into a format suitable for the Spoke EIS system.
  After translation, the outbound adapter uses the EIS connector from the connection pool.
  The EIS connector manages the connection lifecycle.
  The adapter sends the data to the EIS system after making a connection to EIS system.

Exemplary Remote Managing and Monitoring of Smart Connectors

Figure 7:
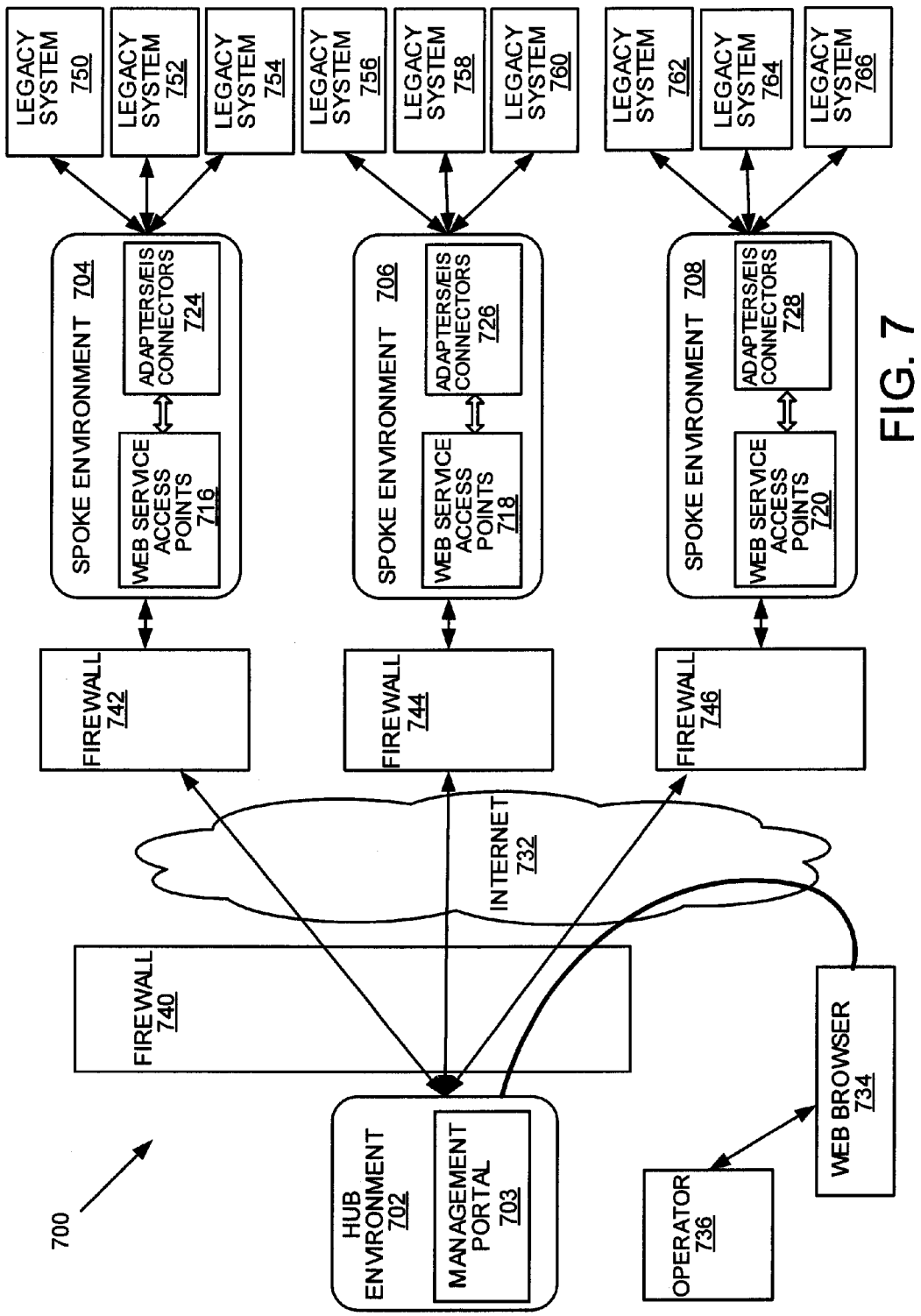
FIG. 7 is a block diagram showing an exemplary software system having an infrastructure for enabling remote management and monitoring of smart connectors.

FIG. 7 is a block diagram showing an exemplary software system 700 having an infrastructure for enabling remote management and monitoring of smart connectors. The exemplary software system 700 comprises a hub environment 702 having a management portal 703, and multiple spoke environments 704-708 having Web Service Access Points 716-720 and Adapters and EIS Connectors 724-728. The spoke environments communicate with various legacy systems 750-766, such as, for example, internal software applications running at the spoke. The management and monitoring of the Spoke environments 704-708 can be done through multiple portals, but desirably is accomplished through a single centralized management portal 703 hosted in the hub environment 702. An operator 736 can interact through a web browser 734 with the management portal 703 (via the internet 732 and a firewall 740). Through the portal 703, the user can access the run-time and status information of the hub 702 and spoke environments 704-708. The spoke environments 704-708 can be accessed through the internet 732 and separate firewalls 742-746. One exemplary management portal 703 provides the following functionalities:
  Starting and stopping the hub environment 702.
  Starting and stopping the spoke environments 704-708.
  Viewing the system health of both hub 702 and spoke environments 704-708.
  Viewing the transaction logs and status in both hub 702 and spoke environments 704-708.
Through the Management Portal 703, an operator 736 can monitor and manage multiple spoke environments 704-708 remotely with minimal involvement of information technology (IT) staff at the trading partner sites.

Exemplary Remote Recovery Mechanism

Through the Management Portal 703, the operator 736 can remotely start and stop the hub 702 and spoke environments 704-708. Additionally, via management portal 703, the user can determine and/or the portal can indicate failures that occur at the system level or at the transaction level.
  An operator 736 can observe failure through the management portal 703. On an occurrence of a failure, the management portal 703 desirably provides the capability to the operator 736 to remotely restart either the system, in case of system failure, or recover certain failed transactions, in case of transaction failure.
  An operator 736 can desirably start the recovery process through the management portal 703. Transactions can be processed through the messaging service that provides message delivery.
  The recovery process can reinitiate the transactions/messages from the messaging service. These transactions can be resent for processing from the messaging service and, once they complete successfully, the status can be indicated again in the management portal.

Exemplary Creation of New Transactions or Modification of Existing Ones

Creation of new transactions or modification of existing transactions in the trading partner environments can be done remotely through the management portal. Through the management portal, trading partner management can be performed remotely by the operator 736. If a new transactions needs to be added to the trading partner environment, this can be done, for example, in the following three steps:
  An operator can use the trading partner manager through the management portal to define the new transaction for the trading partner. This configuration can be saved in the hub environment and also transmitted to the remote spoke environment for the trading partner.
  The operator can use the Adapter Generator to create a new adapter. The adapter generator can provide a graphical interface to map the data elements required for the transactions with the enterprise system data source. With the mappings, the adapter generator can then generate an adapter that can extract the necessary data for the enterprise data source and format it to the necessary output data format.

An operator can remotely upload and install the new adapter in the spoke environment. The hub software uploads the new adapter in the spoke environment and through the management portal the operator can then configure this new adapter remotely.

Exemplary Computing Environment

Figure 8:
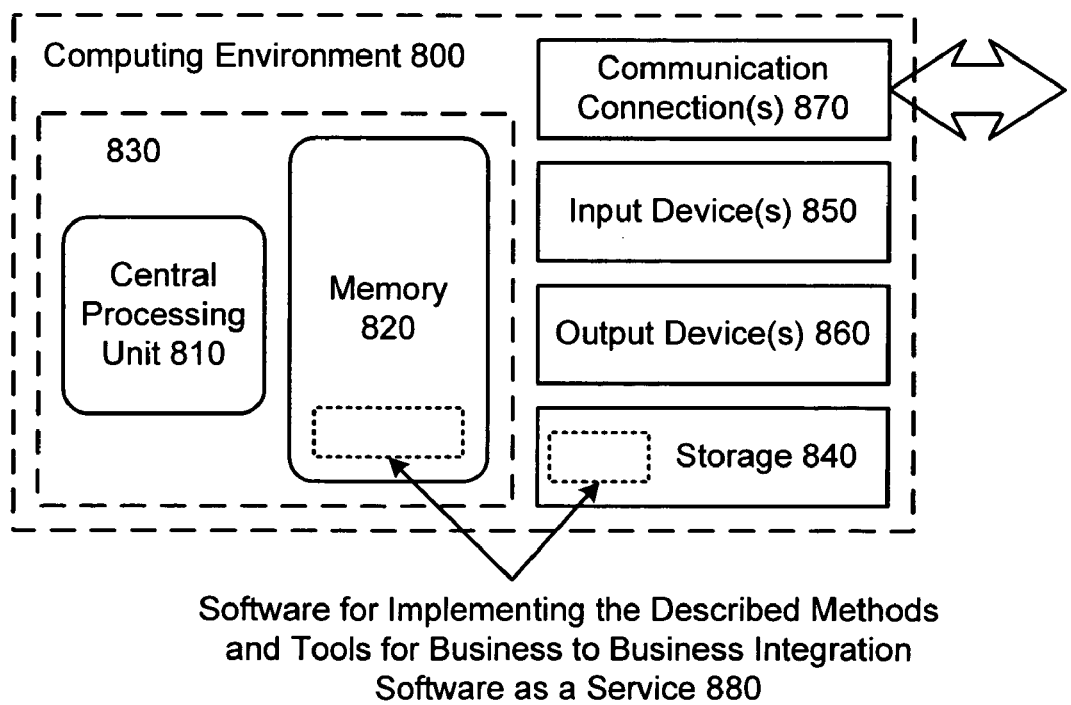
FIG. 8 is a block diagram showing a generalized example of a suitable computing environment in which the following described embodiments can be implemented.

FIG. 8 illustrates a generalized example of a suitable computing environment 800 in which described embodiments may be implemented. The computing environment 800 is not intended to suggest any limitation as to scope of use or functionality of the disclosed technology, as it may be implemented in diverse general-purpose or special-purpose computing environments.

With reference to FIG. 8, the computing environment 800 comprises at least one central processing unit 810 and memory 820. In FIG. 8, this most basic configuration 830 is included within a dashed line. The central processing unit 810 executes computer-executable instructions and may be a real or a virtual processor. In a multi-processing system, multiple processing units execute computer-executable instructions to increase processing power and as such CPU 830 can be running simultaneously with other processors. The memory 820 can be volatile memory (e.g., registers, cache, or RAM), non-volatile memory (e.g., ROM, EEPROM, or flash memory), or some combination of the two. The memory 820 stores software 880 implementing the described methods and tools for business to business integration software as a service.

A computing environment can have additional features. For example, the computing environment 800 can comprise storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The storage 840 can be removable or non-removable, and can include magnetic disks, magnetic tapes or cassettes, CD-ROMs, CD-RWs, DVDs, or any other medium which can be used to store information and which can be accessed within the computing environment 800. The storage 840 stores instructions for the software 880 implementing the described methods and tools for business to business integration software as a service.

The input device(s) 850 can be a touch input device such as a keyboard, mouse, pen, or trackball, a voice input device, a scanning device, or another device that provides input to the computing environment 800. For audio, the input device(s) 850 can be a sound card or similar device that accepts audio input in analog or digital form, or a CD-ROM reader that provides audio samples to the computing environment. The output device(s) 860 can be a display, printer, speaker, CD-writer, or another device that provides output from the computing environment 800.

The communication connection(s) 870 enable communication over a communication medium to another computing entity. The communication medium conveys information such as computer-executable instructions, compressed graphics information, or other data in a modulated data signal.

Computer-readable storage media are any available tangible media that can be accessed within a computing environment. By way of example, and not limitation, with the computing environment 800, computer-readable media includes memory 820, storage 840, or some combination thereof.

The various tools and systems such as, but not limited to, a host environment (e.g., the exemplary host environment 102 of FIG. 2) and a spoke environment (e.g., the exemplary spoke environment 104 of FIG. 3) described herein for implementing the described business to business integration software as a service are in one aspect a machine comprising a processor (e.g., CPU 810 of FIG. 8) programmed according to computer-executable instructions represented at least in part in memory 820 and storage 840 to execute the functionality represented therein.

In this disclosure, the terms "a,", "an," and "at least one" encompass the singular, the plural, and both. For example, if two or more of a given element are present, there is also "an element of such elements" that is present.

Having described and illustrated the principles of the disclosed technology with reference to the illustrated embodiments, it will be recognized that the illustrated embodiments can be modified in arrangement and detail without departing from such principles. Elements of the illustrated embodiment shown in software may be implemented in hardware and vice versa. Also, the technologies from any example can be combined with the technologies described in any one or more of the other examples. In view of the many possible embodiments to which the principles of the disclosed technology may be applied, it should be recognized that the illustrated embodiments are examples and should not be taken as a limitation on the scope of the disclosed technology. For instance, various components of systems and tools described herein may be combined in function and use. We therefore claim as our invention all subject matter that comes within the scope and spirit of the following claims.

We claim:

1. A method, comprising:
   a computer-implemented act of providing a hub environment, the hub environment comprising a hub web service access point, a hub transaction router, a hub messaging system, a hub adapter container, a hub adapter generator a hub enterprise information system (EIS) connector, and a hub management console;
   generating a plurality of spoke environments, at least one of the plurality of spoke environments comprising:
   a spoke web service access point;
   a spoke messaging system;
   an adapter container comprising:
     (i) one or more adapters configured to map data elements of one or more transaction types used for interactions between at least one EIS local to a first computer and at least one EIS local to a second computer to data fields of the at least one enterprise information system local to the second computer; and
     (ii) a pre-filter and a post filter for at least one of the one or more adapters, wherein the pre-filter and the post filter are used as part of an auditing service;
   a spoke EIS connector;
   a spoke configuration manager configured to define new transaction types, in communication with the hub environment, and process web service requests therefrom, wherein the spoke configuration manager configures the pre-filter and the post filter; and
   a spoke management server;

deploying the plurality of spoke environments to one or more remote computers, at least one spoke environment of the plurality of spoke environments being deployed to the second computer for installation on the second computer; and exerting control over the plurality of at least one spoke environment deployed to the second computer via the hub environment, the exerting comprising:

defining one or more new transaction types via the hub management console;

generating, via the hub adapter generator, one or more new adapters configured to map data elements of the one or more new transaction types to data fields of at least one EIS local to the second computer;

deploying the one or more new adapters and the one or more new transaction types from the hub environment to the at least one spoke environment deployed to the second computer; and deploying the one or more new adapters into the spoke adapter containers of the at least one spoke environment deployed to the second computer via at least one spoke configuration manager of the at least one spoke environment deployed to the second computer.

2. The method of claim 1, further comprising a computer-implemented act of providing a secure communication channel between the hub environment and the at least one spoke environment deployed to the second computer.

3. The method of claim 1, wherein the generating a plurality of spoke environments further comprises providing a downloadable and configurable client component.

4. The method of claim 1, further comprising defining interfaces, the one or more transaction types, and connectors through the hub management console.

5. The method of claim 1, further comprising generating the one or more adapters within the hub adapter container with the hub adapter generator.

6. The method of claim 1, further comprising a computer-implemented act of configuring, via the hub environment, the at least one spoke environment deployed to the second computer to connect to the at least one EIS local to the second computer.

7. The method of claim 1, further comprising a computer-implemented act of extracting data from the at least one EIS by the at least one spoke environment.

8. The method of claim 7, further comprising a computer-implemented act of transforming the extracted data by the at least one spoke environment into one of the one or more transaction types by one of the one or more adapters.

9. The method of claim 8, further comprising a computer-implemented act of sending the transformed data from the at least one spoke environment to the hub environment.

10. The method of claim 1, wherein at least one of the plurality of spoke environments further comprise a recovery manager controllable by the hub environment.

11. The method of claim 1, wherein the hub environment further comprises a trading partner management system configured to set up transaction definitions and related authorization rules for at least one of the plurality of spoke environments.

12. The method of claim 1, wherein the hub environment further comprises a spoke environment generator.

13. The method of claim 1, wherein for at least one of the plurality of spoke environments, the post filter is positioned between at least one or more adapters and the spoke EIS connector.

14. The method of claim 1, wherein at least one of the plurality of spoke environments further comprise a network firewall, the exerting control over the at least one spoke environment deployed to the second computer via the hub environment further comprising configuring one or more settings of the network firewall of the at least one spoke environment deployed to the second computer.

15. A non-transitory computer-readable storage medium having stored thereon computer-executable instructions for performing a method of providing business to business integration software as a service, the method comprising:

providing a hub environment, the hub environment comprising a hub web service access point, a hub transaction router, a hub messaging system, a hub adapter container, a hub adapter generator, a hub enterprise information system (EIS) connector, and a hub management console;

generating a plurality of spoke environments, at least one of the plurality of spoke environments comprising:

a spoke web service access point;

a spoke messaging system;

an adapter container comprising:

(i) one or more adapters configured to map data elements of one or more transaction types used for interactions between at least one EIS local to a first computer and at least one EIS local to a second computer to data fields of the at least one EIS local to the second computer, wherein the transaction types comprise one or more selected from the group consisting of purchase order, purchase order acknowledgement, invoice, and advance ship notice; and (ii) a pre-filter and a post filter for at least one of the one or more adapters;

a spoke EIS connector;

a spoke configuration manager configured to define new transaction types, in communication with the hub environment, processing web service requests therefrom, and deploy new adapters into the adapter container, wherein the spoke configuration manager configures the pre-filter and the post filter; and a spoke management server; and deploying the plurality of spoke environments to one or more remote computers, at least one of the plurality of spoke environments deployed to the second computer for installation on the second computer;

exerting control over the at least one spoke environment deployed to the second computer via the hub environment, the exerting comprising, after deploying the at least one spoke environment deployed to the second computer:

defining one or more new transactions types via the hub management console;

generating, via the hub adapter generator, one or more new adapters configured to map data elements of the one or more new transaction types to data fields of at least one EIS local to the second computer;

deploying the one or more new adapters and the one or more new transaction types from the hub environment to the at least one spoke environment deployed to the second computer; and deploying the one or more new adapters into the adapter containers of the at least one spoke environment deployed to the second computer via the at least one spoke configuration manager of the at least one spoke environment deployed to the second computer.

* * * * *

UNITED STATES PATENT AND TRADEMARK OFFICE
CERTIFICATE OF CORRECTION

| | | |
|---|---|---|
| PATENT NO. | : 8,046,441 B2 | Page 1 of 1 |
| APPLICATION NO. | : 11/401533 | |
| DATED | : October 25, 2011 | |
| INVENTOR(S) | : Banerji et al. | |

It is certified that error appears in the above-identified patent and that said Letters Patent is hereby corrected as shown below:

In the Claims:

Col. 16, Line 44 (Claim 1), "generator" should read --generator,--

Signed and Sealed this
Twelfth Day of June, 2012

David J. Kappos
*Director of the United States Patent and Trademark Office*